United States Patent [19]

Anderson et al.

[11] Patent Number: 5,106,259

[45] Date of Patent: Apr. 21, 1992

[54] METHOD FOR LOADING TRANSPORT RACKS

[75] Inventors: Roger Anderson, Southbury; Stephen Burgess, Bethel, both of Conn.

[73] Assignee: Robotic Originals, Inc., Danbury, Conn.

[21] Appl. No.: 645,038

[22] Filed: Jan. 22, 1991

[51] Int. Cl.$^5$ .............................................. B65G 1/06
[52] U.S. Cl. ..................................... 414/786; 414/331; 414/273; 414/280; 414/661; 901/47
[58] Field of Search ............... 414/273, 274, 275, 277, 414/280, 331, 618, 786, 661; 901/47

[56] References Cited

U.S. PATENT DOCUMENTS

| | | | |
|---|---|---|---|
| 1,561,664 | 11/1925 | Rathwell | 414/331 |
| 1,779,210 | 10/1930 | Davis | 414/331 |
| 3,557,977 | 1/1971 | Atwater et al. | 414/274 X |
| 3,695,464 | 10/1972 | Kaji | 414/277 |
| 3,700,121 | 10/1972 | McManus | 414/331 |
| 3,973,685 | 8/1976 | Loomer | 414/273 |
| 4,203,696 | 5/1980 | Lindberg | 414/331 |
| 4,277,216 | 7/1981 | Lindberg | 414/331 |
| 4,621,969 | 11/1986 | Berghäll et al. | 414/331 |
| 4,634,333 | 1/1987 | Butterly, Jr. et al. | 414/331 |

Primary Examiner—Robert J. Spar
Assistant Examiner—James Keenan
Attorney, Agent, or Firm—Schweitzer Cornman & Gross

[57] ABSTRACT

An automated rack loading system for loading trays of products, especially bakery products, into racks for transport by delivery trucks. An empty transport rack is brought to the loader, and its shelf structure is scanned on each side to locate shelf brackets and to detect any left-over trays still residing on the supposedly empty rack. The precise height of each bracket on each side is noted, and pairs of brackets are compared to determine vertical height differentials, missing brackets, and damaged brackets. Filled trays are advanced on a conveyor to the loader station, where individual trays are loaded into a lift mechanism having lift brackets capable of carrying trays from the lowermost rack shelf position to the uppermost. A loading program, based on the original scan of the transport rack, moves flights of the lift mechanism, filled with trays, to the nearest available open rack position. A pusher mechanism is moved independently to a position opposite the selected open rack position and pushes the selected tray into the rack. While the transport rack is being loaded, additonal trays are being delivered to and pre-loaded onto the lift mechanism. Automated loading of transport racks is possible, even though successive racks are of non-standard configuration.

10 Claims, 11 Drawing Sheets

METHOD FOR LOADING TRANSPORT RACKS

BACKGROUND AND SUMMARY OF THE INVENTION

In connection with the distribution of bakery products, such as bread loaves, rolls, etc., conventional practice involves the initial loading of product packages onto trays or shallow baskets. (For convenience, both trays and baskets will be referred to herein as trays). The loaded trays are then inserted onto wheeled transport racks comprised of a series of vertically spaced opposed pairs of tray-supporting brackets mounted at opposite sides of a rack frame structure. Commonly, the tray supporting brackets are long enough to hold two trays, and adjacent sets are separated vertically by a relative minimum distance to accommodate one above the other without interference. In a typical case, a rack may hold 30 or more trays, for example, in 15 levels of two trays each. After being loaded with trays, the transport racks are wheeled onto the delivery trucks, which carry them to the retail stores.

In the process of automating bakery operations, one of the most difficult and intransigent operations has been that of loading the transport racks with trays filled with bakery products. The process has resisted automation in part because of the relatively crude, non-standardized character of the racks themselves, as well as because of the condition of the racks and trays after a period of time in service. For example, in a given rack, the vertical spacing between pairs of tray-supporting brackets may not be uniform. Indeed, the height of the brackets of an opposed pair may not even be the same. In addition, after racks have been in service for a period of time, some of the tray-holding brackets may become bent or otherwise damaged. In addition to the foregoing, while the racks used by a particular bakery may be generally similar in size and configuration, different bakeries typically may use racks of entirely different configuration.

An "obvious" solution to the problem of non-standardization in the transport racks would be to provide, for automation purposes, a redesigned rack of highly standardized construction, manufactured to acceptable tolerance levels. However, bakeries have in circulation enormous numbers of the existing transport racks, and the economics of replacing all of such racks would be prohibitively expensive.

In accordance with the present invention, a novel and improved method and apparatus is provided for automated loading of bakery transport racks, which effectively deals with the racks in their existing, non-standardized, non-ideal configurations, while enabling totally automated, high speed loading of the transport racks with trays filled with bakery products.

Pursuant to one aspect of the invention, an empty transport rack, in preparation for loading, is scanned vertically along opposite sides, by an optical or other suitable scanner device which detects the presence of each tray-holding bracket and records its vertical height in relation to a known reference. The respective heights of each bracket of each opposed pair are compared, and the higher of the two serves as the basis for a stored height location for that pair of brackets. In addition, the difference between the vertical height measurements for the two brackets of a pair is compared against a reference standard. If the difference in vertical height is excessive, so that a tray could not be properly supported by the bracket pair, that fact is registered in a temporary data base so that, during loading, that bracket pair is by-passed.

In accordance with another aspect of the invention, during the initial scan of a transport rack presented for loading, the distance required to complete the scan of a given bracket is compared against a predetermined standard. If the distance is indicated to be excessive, as compared to the standard, that is an indication that the bracket is bent or deformed, and that fact is registered in the temporary data base, so that the defective bracket is by-passed during loading.

During the above described optical scan of a newly presented transport rack, an acoustical scan is also made of the rack, in order to detect the presence of any trays which may have inadvertently been left on the rack and would prevent the loading of a new tray at the same location. If any such residual trays are detected the location thereof is registered in the temporary data base for subsequent control of the rack loading operations.

Pursuant to another aspect of the invention, a loading mechanism is provided, which includes a lifting mechanism onto which trays, filled with product, are pre-loaded. The lift mechanism comprises opposed pairs of tray-holding brackets movable vertically and controllably driven in accordance with data stored in the temporary data base, in order to deliver loaded trays to preselected levels opposite a usable set of brackets on the transport rack to be loaded. In conjunction with the tray lift mechanism, a pusher mechanism is provided, which is vertically movable independently of the lift mechanism, and is movable to a location at which a tray, filled with product, is properly aligned with a usable set of brackets on the transport rack. The pusher serves to move the tray from the lift mechanism onto the brackets of the transport rack.

In a typical case, the transport rack is of a two-deep construction, capable of receiving two trays on each set of brackets. To this end, the pusher mechanism is constructed for two stage operation, so that, at each usable bracket location, a first tray is pushed to the back of the transport rack, and a second tray is pushed to the front position on the rack.

Desirably, the pusher mechanism includes both a tray gripping means and a load sensing element. In cases where the pusher mechanism encounters unexpected resistance, such resistance is immediately sensed by the load sensing element. The pusher mechanism is retracted and the tray is withdrawn, and the temporary data base is revised to indicate by-passing of that rack location.

During loading of a transport rack, and also during the time interval when a filled rack is removed and replaced by an empty rack, trays filled with bakery products arrive at the load station via a conveyor system and are pre-loaded onto bracket pairs of the lift mechanism. Thus, at any time, the lift mechanism may be holding several of the pre-loaded trays. The design of the system is such that trays are transferred from the elevator mechanism to the transport racks at a rate greater than trays arrive via the conveyor system, so that trays do not progressively accumulate on the elevator mechanism. During removal and replacement of the transport racks, however, several trays may accumulate on the elevator mechanism. According to another aspect of the invention, after an empty transport rack is installed at the loading position and has been scanned with respect to the location and condition of its tray-holding brackets and possible residual trays, a loading schedule is automatically constructed, based upon the registered locations of usable brackets and positions of the transport rack and the number and location of trays, filled with product, that have been pre-loaded onto the elevator mechanism. This schedule is prepared by computer algorithm, which then governs the loading of the transport rack then in position to be loaded.

Among other conditions, the program seeks to load the transport rack from the bottom up, with minimum vertical motion of the elevator mechanism and, to the extent possible, avoiding moving any tray on the elevator mechanism above any empty usable bracket position on the transport rack. A highly efficient, high speed loading procedure is realized by this technique.

For a more complete understanding of the above and other features and advantages of the invention, reference should be made to the following detailed description of a preferred embodiment and to the accompanying drawings.

DESCRIPTION OF A PREFERRED EMBODIMENT

Figure 1:
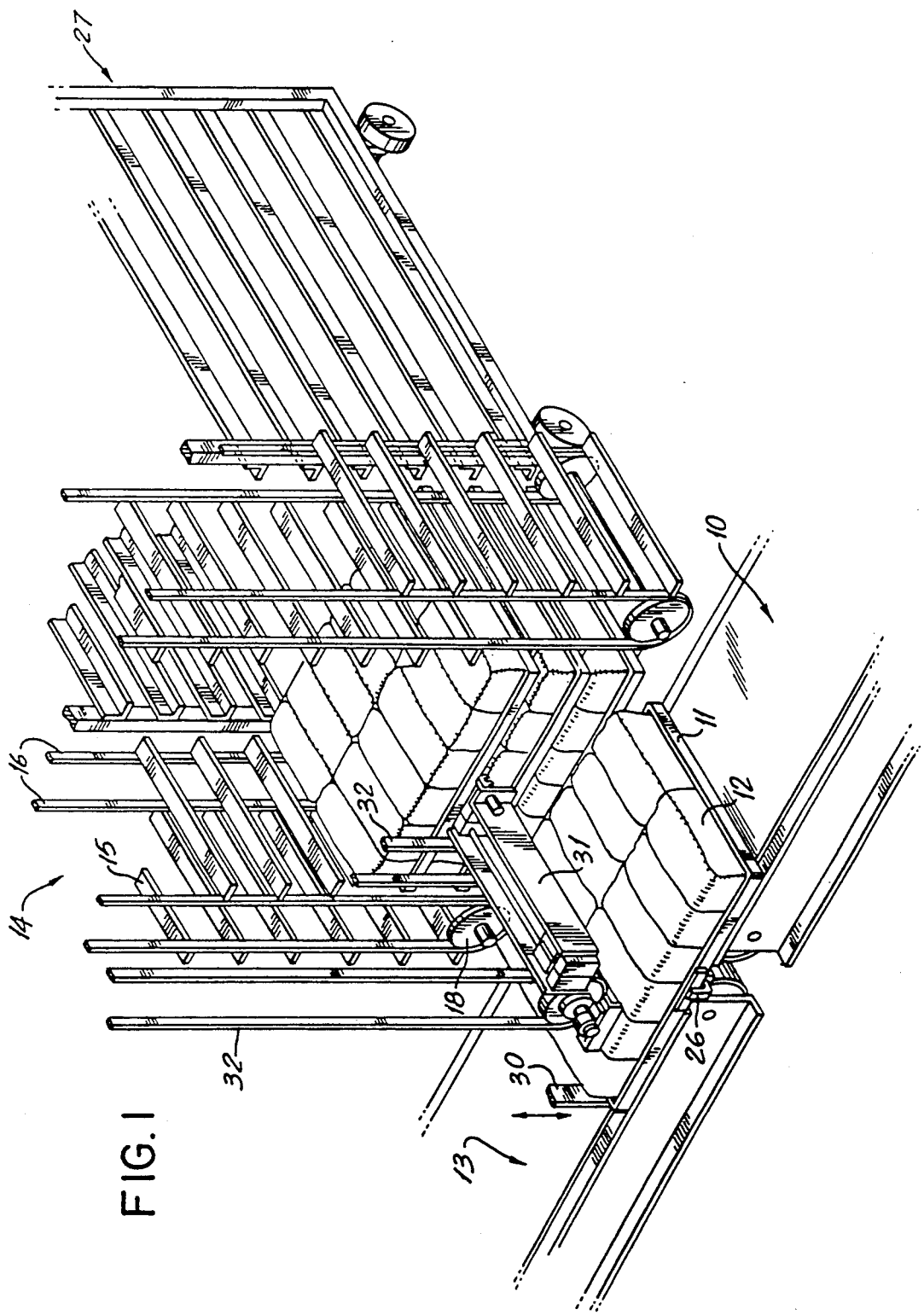
FIG. 1 is a fragmentary perspective representation of a rack loading mechanism constructed in accordance with the principles of the invention.

Referring now to the drawings, and initially to FIGS. 1-4 thereof, the reference numeral 10 designates generally a supply conveyor, for successively supplying flat trays 11 filled with bakery products 12, such as bread loaves. The trays 11 are of conventional design and form no part of the invention. An exit conveyor 13, usually driven separately from the supply conveyor 10, is aligned with the supply conveyor 10. In normal operation, a filled tray 11 is advanced by the conveyor 10 to a predetermined pre-load position, as shown in FIG. 1, partly supported on the exit conveyor 13 and partly on the supply conveyor 10. A suitable stop 30 engages the tray to hold it in a desired pre-load position. If, for some reason, the tray cannot be processed, the stop is retracted, and the tray is carried away by the exit conveyor 13, either to another load station or a manual processing station, as the case may be.

Figure 10:
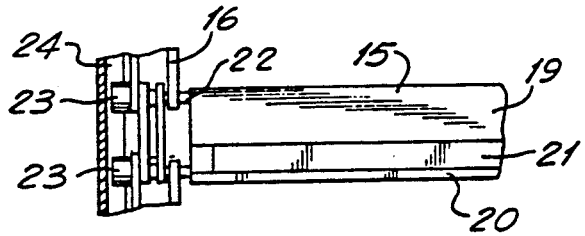
FIG. 10 is a fragmentary view, partly in section, of a tray lifting bracket forming part of the lift mechanism of the invention.

Positioned adjacent the conveyors 10, 13, at the load station, is a lift mechanism, generally designated by the reference numeral 14, which includes a plurality of pairs of opposed tray-lifting brackets 15 mounted on endless chains 16 trained about upper and lower sprockets 17, 18. The lift brackets 15, shown in more detail in FIG. 10, advantageously are of L-shaped configuration, comprising a vertical panel 19 and a horizontal panel 20, the latter for supporting one end of a tray. A spacer strip 21 may be desired, for proper positioning of trays on an opposed pair on the elevator brackets. At their opposite ends, the brackets 15 are attached by pins 22 to the drive chains 16. On the opposite side of the chains from the brackets there are guide rollers 23 which are closely received in a vertical guide channel 24 of U-shaped cross section. The guide channels 24 extends alongside the chains 16 throughout most of their vertical reach, and serve to rigidly orient the lift brackets 15, which could otherwise tend to tilt inwardly under load. Both lift chains 16 are driven by a single digitally controlled step motor 25, so that movement of the lift chains on opposites sides is identically controlled, and the position of the chains is subject to precise control by a digital (i.e., computerized) control system.

Opposed pairs of the lift brackets 15 are arranged to receive trays from the conveyor belt load station. To this end, a selected pair of lift brackets is positioned at the desired level, which may be referred to as the pre-load level, generally directly opposite a tray at the pre-load station. A pre-load pusher, including a pusher bracket 26 (FIG. 1) actuated by a fluid cylinder or the like (not shown) extending underneath the tray, draws the tray 11 laterally off of the conveyor belts and onto the selected pair of lift brackets. When the pre-load operation has been completed, the lift mechanism can be indexed, to bring the next empty set of lift brackets into position at the pre-load level or to perform another operation. In the meantime, the pusher bracket 26 is returned to its normal position, at the outside of the conveyor line, in position to engage the next tray supplied by the conveyor 10.

As will be described more fully hereinafter, successive pre-load operations, involving the loading of product-filled trays from the conveyors 10, 13, advantageously are interspersed with one or more loading operations, involving the pushing of a tray off of the lift mechanism and onto a transmovement port rack (designated by the numeral 27 in FIG. 1). The transport rack is positioned at the opposite (back) side of the lift mechanism 14, so that product-filled trays are pre-loaded onto the lift mechanism from the front side and loaded into the transport rack from the back side.

While pre-loading of trays onto the lift mechanism is done at a single level, i.e., that of the conveyors 10, 13, by means of the pre-load pusher 26, loading of trays from the lift mechanism into the transport rack 27 is accomplished by a different pusher mechanism 31, shown in detail in FIGS. 4-9. The pusher mechanism is carried by a spaced pair of vertical belts or chains. In a typical, advantageous embodiment, gear belts may be employed to advantage. These are driven by a digital step motor 33 (FIG. 2), so that the vertical position of the pusher mechanism 31 may be precisely controlled in accordance with a digital input. To advantage, the pusher mechanism 31 includes a mounting plate 34 to which the gear belts 32 are fixed, and which mounts all of the other apparatus of the pusher mechanism. At each end, the mounting plate 34 carries a pair of vertical spaced guide rollers 35, 36. These guide rollers are received within vertical, U-shaped guide channels 37, one of which is illustrated in fragmentary fashion in FIG. 2. The guide rollers 35, 36 and channel 37 serve to maintain the vertical orientation of the mounting plate 34 during movements of the pusher mechanism vertically upward or downward, by means of the motor driven gear belts 32.

As will be more fully described hereinafter, during rack loading operations, the lift mechanism 14 is actuated under the direction of the control system to elevate trays, previously pre-loaded onto the brackets 15, to the level of an open position space in the transport rack 27. The controller simultaneously moves the pusher mechanism 31 vertically to that location and causes the pusher mechanism to be actuated to displace a tray from the lift mechanism onto the transport rack, either to a back position, if it is empty, or to the front position, if the back position is already filled.

With reference to FIGS. 6-9, the pusher mechanism 31 comprises first and second stage extensions 38, 39, carried by the mounting plate 31 for guided forward movement by means of actuators 40, 41. The actuators 40, 41 desirably are rodless cylinders suitable for properly positioning the respective extensions. The mounting plate 31 carries a first set of V-grooved guide rollers 42 cooperating with tapered edge guides 43 of the second stage extension, which allow the second stage extension 39 to be projected forward when moved by its actuator 41. The second stage extension carries a similar set of V-grooved guide rolls 44, cooperating with tapered edge strips 45 of the first stage extension, enabling the first stage extension to be projected forward by its actuator 40. The projectable length of the first stage extension 38 is a distance appropriate to move a tray from its pre-load position on the lift mechanism 14 into a loaded position at the front of the transport rack 27. When both first and second stage extensions are projected, the total extension is sufficient to move a tray to the rear portion of the transport rack.

Figure 6:
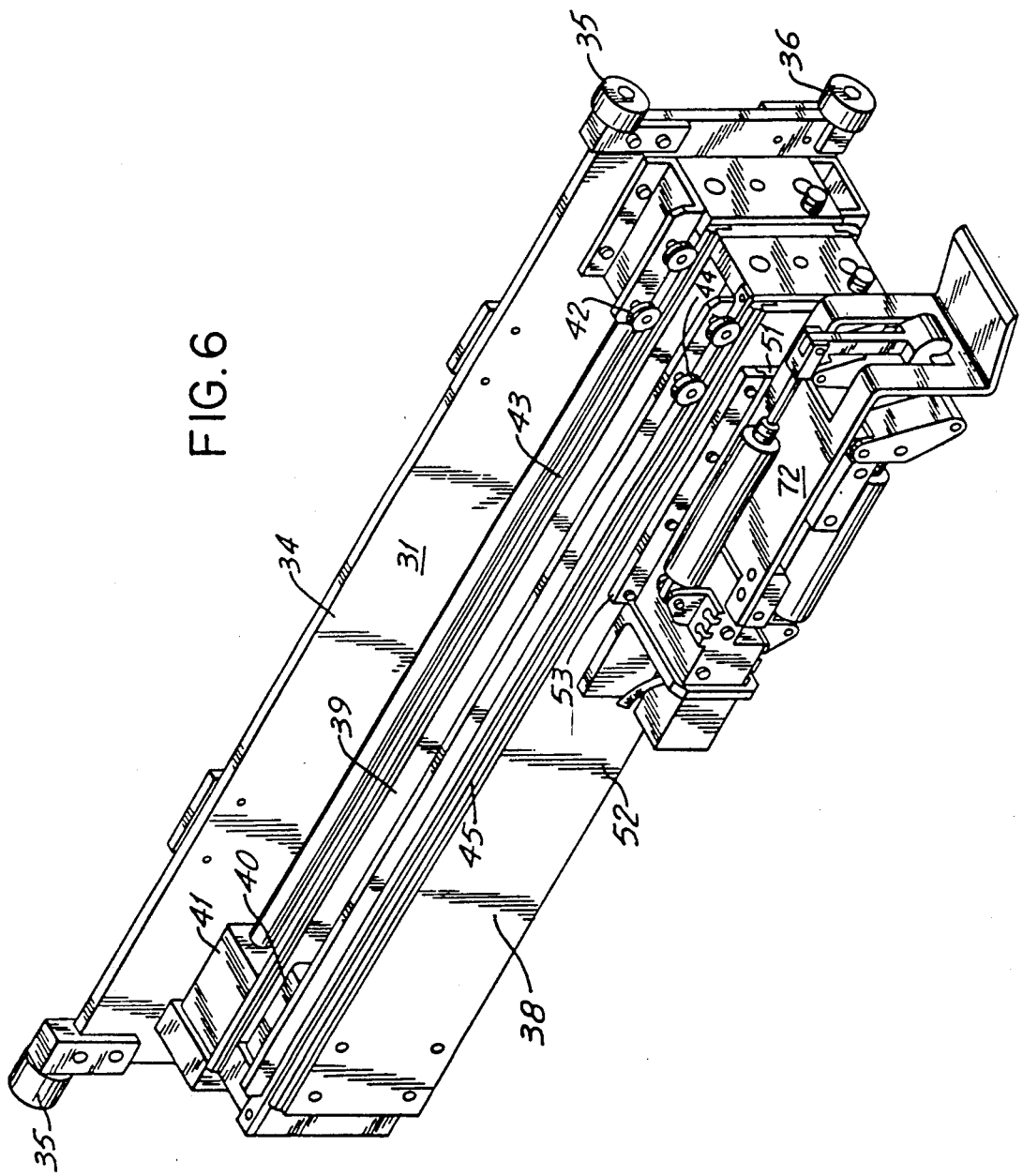
FIG. 6 is an enlarged, perspective illustration of a pusher mechanism advantageously utilized in the apparatus of the invention.
Figure 7:
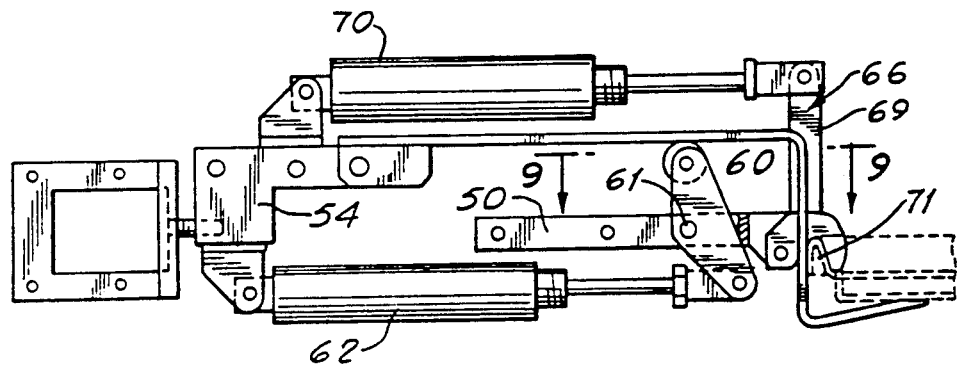
FIGS. 7 and 8 are enlarged elevational views of a tray-gripping apparatus used in the pusher mechanism of FIG. 6, illustrating the gripping mechanism in closed and open positions respectively.
Figure 8:
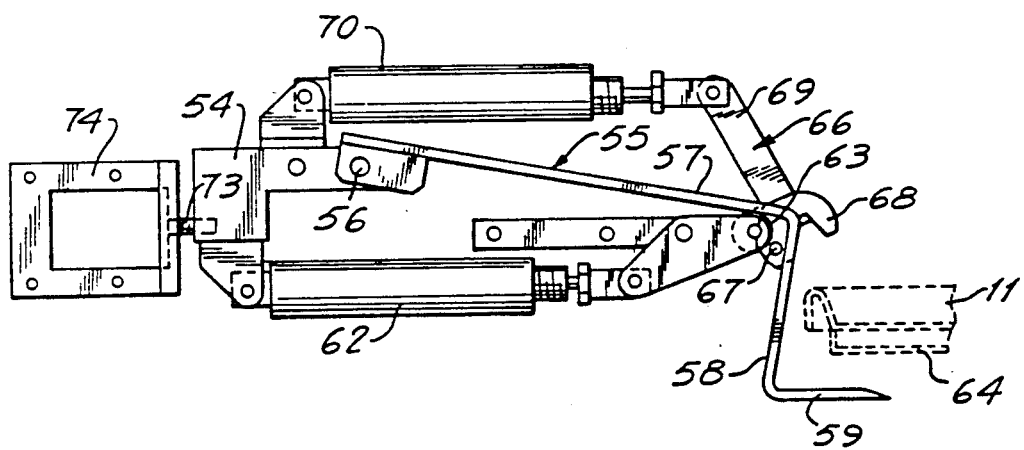
Figure 9:
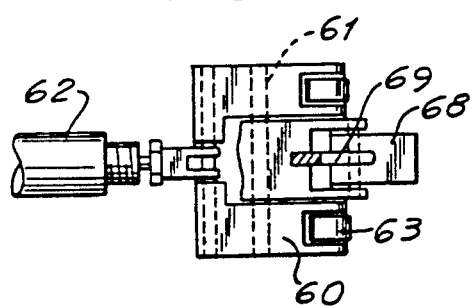
FIG. 9 is a fragmentary cross sectional view as taken generally on line 9—9 of FIG. 7.

The first stage extension 38 of the pusher mechanism carries a tray gripper mechanism, advantageously as shown in FIGS. 7-9 of the drawings. The gripper mechanism is positioned to engage the tray substantially centrally between its supported edges. The mechanism includes a mounting bracket 50, which is fixed to a plate 51 (FIG. 6) mounted for a limited degree of longitudinal sliding movement relative to the plate 52 of the first stage extension, by means of guide bars 53 at opposite edges. A base block 54 is also mounted to the plate 51, and it pivotally mounts a lifting arm 55, at pivot point 56. The lifting arm has a first forwardly extending portion 57, and a downwardly extending portion 58 and a second forwardly extending portion 59 adapted to extend underneath the edge of a product filled tray. A cam lever 60 is pivoted at 61 to the fixed bracket 50. At its lower end, the cam lever is connected to a fluid actuator 62 arranged to pivot the cam lever between positions shown in FIG. 7 and 8 respectively. When approaching a tray 11, the actuator 62 is retracted, pivoting the cam lever 60 to a near-horizontal position, as shown in FIG. 8. Follower wheels 63 on the cam lever, which support the lifting lever 55, allow it to be lowered by gravity, until its lower projecting arm 59 is positioned below the bottom level 64 of the tray (FIG. 8). After the pusher mechanism has moved into position, with the gripping means close to the edge of the tray, the actuator 62 is reversed, causing the lever to be pivoted upwardly, to the position shown in FIG. 7.

Also pivoted on the mounting block 50 is a tray clamp lever 66, which is pivoted at 67 and has a downwardly projecting forward jaw 68 rigidly attached to a lever arm 69. The lever arm 69 is connected to a fluid actuator 70 secured to the mounting block 54. When the pusher mechanism is approaching a tray, the upper fluid actuator 70 is retracted, as is the lower actuator 62. This causes the clamping jaw 68 to be open, as shown in FIG. 8. When the tray has been contacted, both actuators 62 and 70 are extended, causing the tray to be lifted upward into the jaw, and causing the jaw to be closed to firmly grip the folded edge flange 71 of the tray between the jaw 68 and the lifting arm 55.

Desireably, magnetic reed switch (not shown) is positioned to sense the initial movement of the pusher mechanism into position for gripping of a tray. When such positioning is sensed, the fluid actuators 62, 70 are actuated to cause the tray to be gripped in the desired manner.

In many cases, a product filled tray 11 will tend to sag in its center area under the weight of the product carried by the tray. This may be particularly true with respect to trays that have become worn and perhaps slightly damaged from extended service. The gripper mechanism of the invention, providing for the lifting arm 55 to initially be projected underneath the sagging tray and to lift the center portion of the tray to a predetermined position, assures proper gripping of the tray for the subsequent loading operations.

In some cases, where the tray has sufficient rigidity in relation to the weight of the products carried thereby the entire product-filled tray can be lifted slightly in cantilever fashion by the described gripping mechanism. Normally, however, the forward edge of the tray is allowed to rest upon and slide along the tray-supporting brackets.

In accordance with one aspect of the invention, the entire tray clamping assembly, designated by the reference numeral 72 in FIG. 6, is capable of a limited forward/rearward sliding movement in the guide blocks 53. At the back of the gripper assembly 72 it is connected by a bolt 73 or other suitable adjustment device to a load-sensing compression switch 74, which is actuatable under predetermined rearwardly directed force. The arrangement is such that, when the clamping mechanism engages and grips a product tray, and the pusher mechanism is extended to advance the tray into the transport rack 27, if the tray meets an unexpected level of resistance for any reason, the compression switch is actuated, and the pusher mechanism is immediately retracted along with the tray engaged by the gripper mechanism 72. This avoids damage in the case of an undetected deformity or obstacle on the transport rack.

Figure 4:
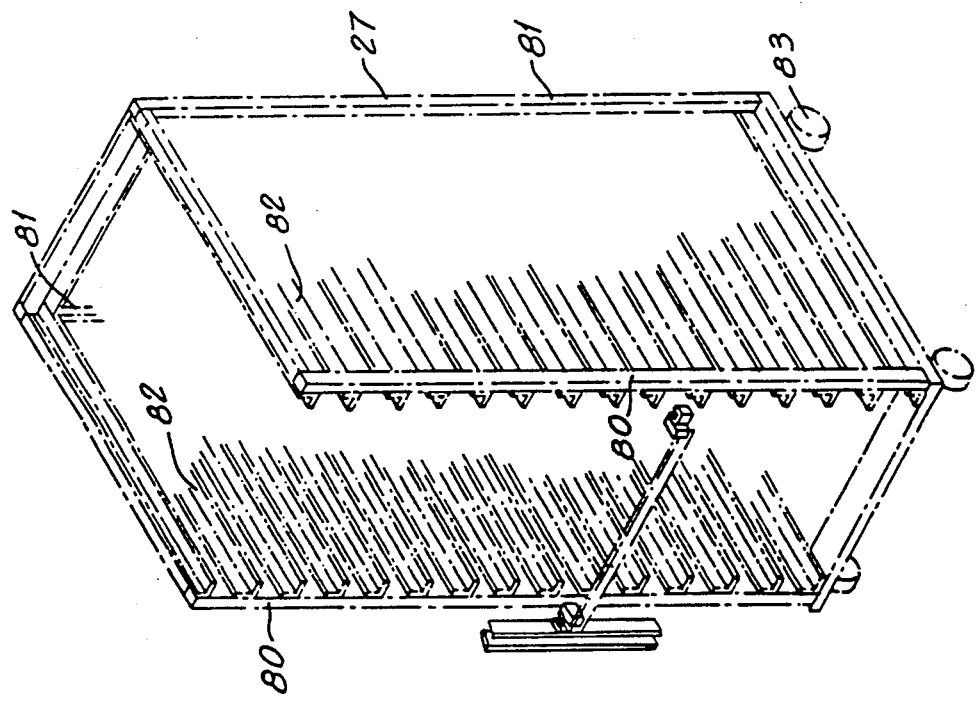
FIG. 4 is a perspective view showing features of a typical transport rack, and illustrating the manner in which the tray-holding brackets thereof are scanned in accordance with the invention.

As shown in FIG. 4, a typical transport rack 27 comprises a simple, skeletal frame structure with sufficient bracing (not specifically shown) to maintain shape, but otherwise minimized for weight reduction purposes. In the illustration of FIG. 4, there are vertical structural supports 80, 81 at each side, which support opposed pairs of L-shaped tray-supporting brackets 82, which extend for substantially the full depth of the transport rack, typically a distance sufficient to accommodate two trays 11 side by side. The brackets are positioned vertically close together, spaced sufficiently to allow enough clearance between vertically adjacent trays to avoid product damage, but otherwise as close together as practical. In a typical case, there may be 15 pairs of tray brackets 82, such that a fully operational rack can accommodate 30 trays loaded with product. Wheels 83 are provided to enable the racks to be moved into and out of the delivery trucks, all in accordance with well known conventional practice.

Because of the manner in which the transport racks have been manufactured, historically, it is quite common for the opposed brackets 82 of the pair to be out of alignment, that is, one slightly higher than the other, and it is also quite common for the spacing between sets of the brackets 82 to be somewhat variable. This has seriously inhibited automation of the rack loading operation, considering that complete replacement of the circulating inventory of transport racks would be prohibitively expensive. Accordingly, pursuant to the present invention, provisions are made for scanning each side of a new transport rack, when brought into loading position against the back side of the lift mechanism, so that the exact location of each bracket of each transport rack, as it is brought into loading position, is ascertained and stored in a memory table for use in controlling the loading sequences.

Figure 3:
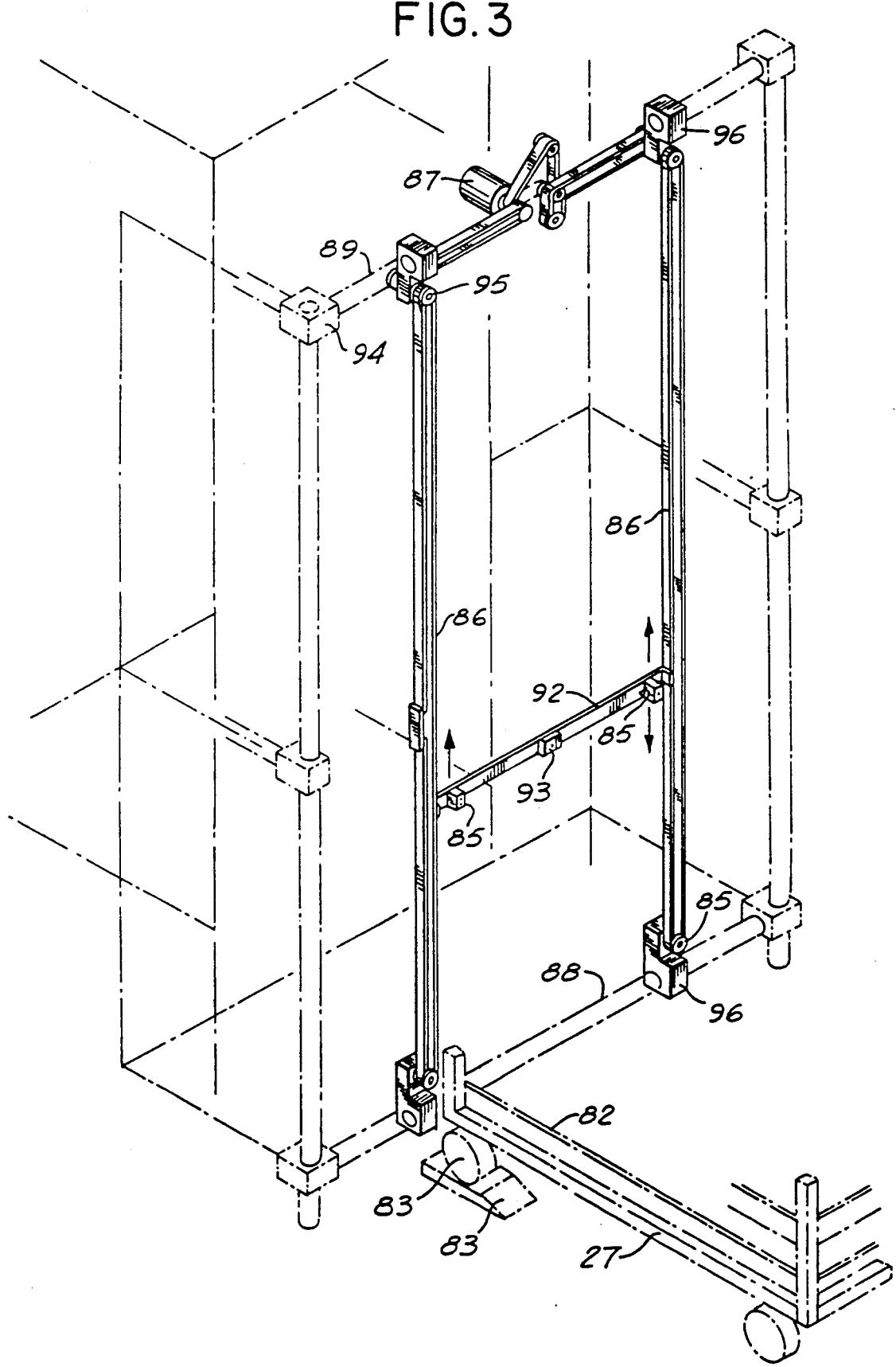
FIG. 3 is a fragmentary perspective illustration, taken from the back of the loading mechanism, illustrating elements for scanning the tray-holding brackets of a transport rack.
Figure 5:
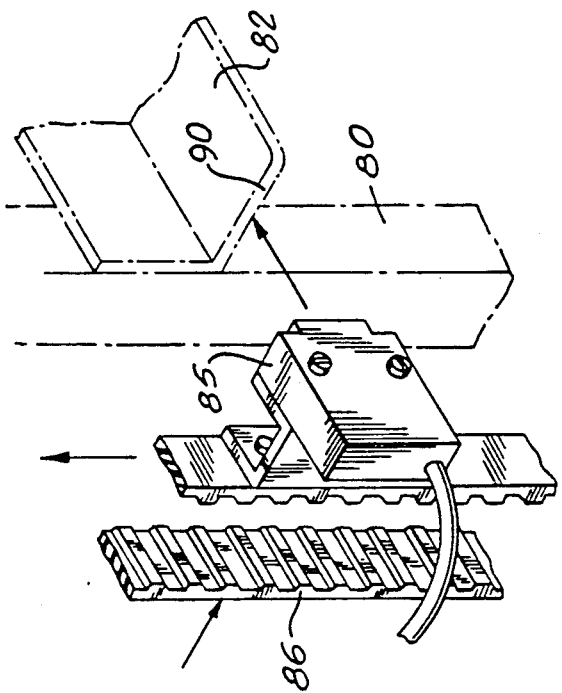
FIG. 5 is an enlarged, perspective illustration showing the scanning of a single bracket of the transport tray.

As reflected in FIG. 3, the back side of the lift mechanism, shown in phantom, is provided with means, such as wheel blocks 84 for properly locating and retaining a transport rack 27 in proper load position. Directly in front of each of the vertical rows of tray-supporting brackets 82 are scanning sensors 85, carried by vertical gear belts 86 and in turn driven by a common digitally controlled drive motor 87. These elements are fixed to the tubular structural elements 88, 89 of the mechanism.

To advantage, the sensors 85 are light source-/photocell sensing devices arranged to project a light beam at the forward edges 90 of the tray-holding brackets 82. Starting from a home position at the bottom of the rack, the belts 86 are driven to carry the sensor elements 85 upwardly in unison. As each one passes the front edge of a tray-supporting bracket 82, the reflection of the light beam is sensed. The return signal thus derived from the sensor 85 is combined with the digital position data from the digitally controlled drive motor 87, so that the exact vertical height of the bracket is established and registered in memory. In the course of a single vertical scan, the positions of each bracket on each side of the rack are thus ascertained and recorded for future processing.

In addition to sensing the mere presence of a bracket 82, the system of the invention also records the distance over which a particular bracket is being sensed. Frequently, the front edge of a tray-supporting bracket will become bent or otherwise damaged, and this can be detected by the fact that the scan of a given bracket is sensed over an excessive distance of travel of the sensing element 85. This information is also recorded for further processing.

Pursuant to one aspect of the invention, the rack is scanned for the possible presence of obstructions, particularly residual trays, inadvertently left on the supposedly empty rack. To this end, the scanning mechanism may advantageously include a support bar 92, extending between the respective mounting brackets for the optical scanners 85, and mounting an acoustical ranging device 93 in its center area. The acoustical ranging device advantageously may be a Polaroid Ultrasonic Single Frequency Board, of a type commercially available from Polaroid Corporation. The ranging device includes a transducer capable of directional transmission and reception of ultrasonic energy pulses and includes circuitry for determining the distance away of a pulse-reflecting object.

When a newly positioned, empty transport rack is optically scanned for evaluation of its tray supporting brackets, it is simultaneously acoustically scanned by activation of the ranging unit 93. If the ranging unit detects any object within the distance range of the interior of transport rack, that fact, and the height at which it occurred, is registered in the temporary data base. Thereafter, when the rack loading process is being carried out, the loading mechanisms will by-pass the obstructed rack position(s).

The scanning operation is complete in a second or two, the information is processed by computer and the loading sequence may then be commenced. To advantage, the entire loading sequence for the empty transport rack is calculated in advance by the computer algorithm, and a sequence of operations is established, which is followed by corresponding actuations of the lift mechanism and pusher mechanism to load the rack 27 in an efficient and extremely expeditious manner.

Figure 2:
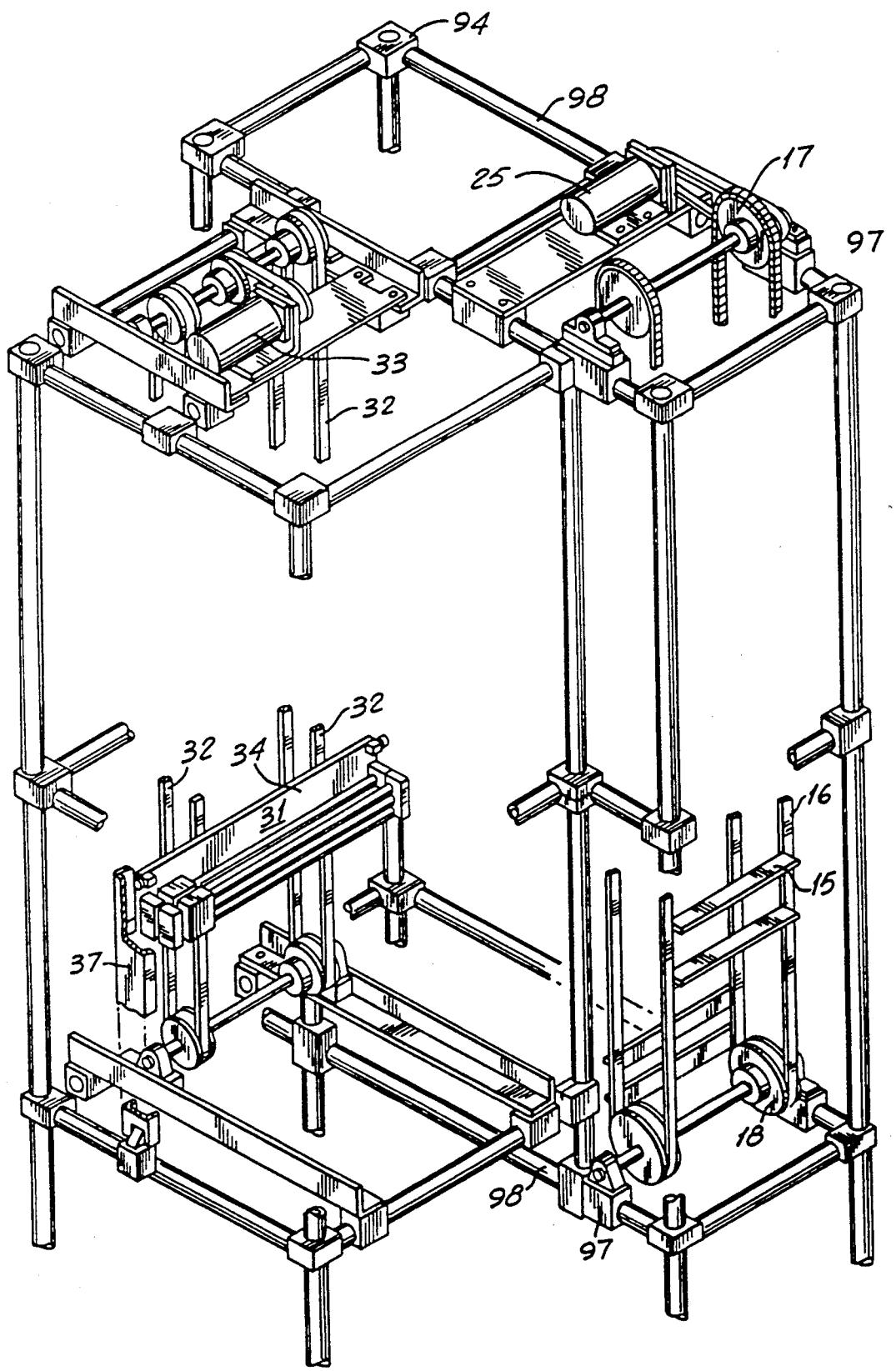
FIG. 2 is a fragmentary perspective representation of certain of the structural elements incorporated in the apparatus of the invention.

As shown in FIGS. 2 and 3 in particular, the apparatus of the invention advantageously is assembled using a tubular structure assembled with clamping elements. One preferred type of clamping device, disclosed in the copending application Ser. No. 609,810, filed 11/6/90, in the name of Roger Anderson, is particularly useful for securing a plurality of tubular structural elements at a joint, as for example at 94 in FIGS. 2 and 3. In the structure illustrated in FIG. 3, the belts 86, supporting the scanning elements 85, 93, are supported by means of belt sprockets 95 mounted on clamping blocks 96, enabling the equipment to be quickly assembled and adjusted to a particular size for the transport racks employed by the end user. The same applies to the structure of the lift mechanism, for example, which may be easily assembled to the size of a particular end user's trays, for example by appropriate positioning of bearing supports 97 along tubular structural elements 98 (See FIG. 2).

Figure 11:
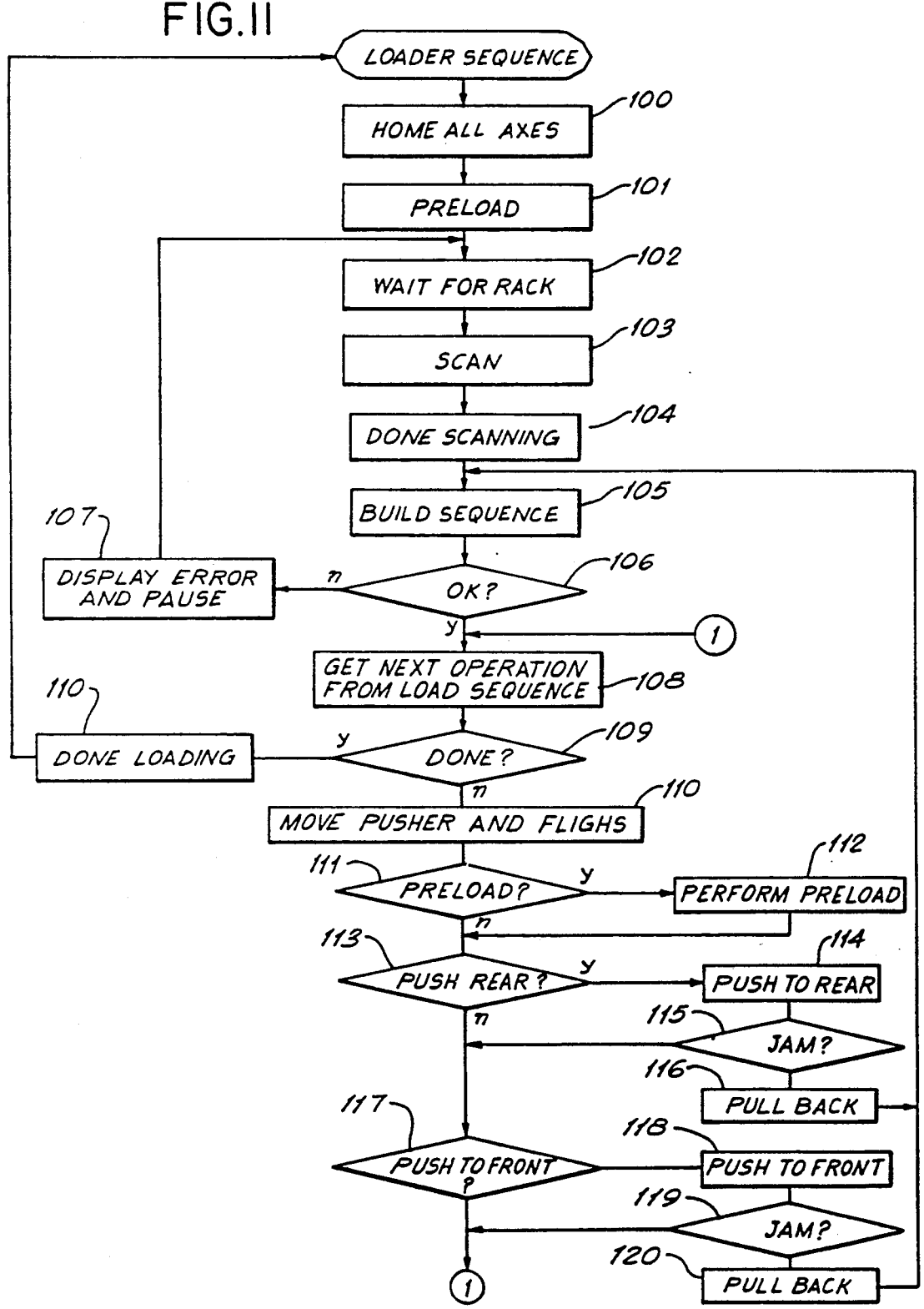
FIG. 11-16 are views of a logic diagram reflecting the control procedure used in accordance with the invention for programmed loading of an empty transport rack.

The operating algorithm for the system of the invention is indicated schematically in FIGS. 11-16. FIG. 11 represents, in a very general sense, the overall operating logic. Initially, the scanning sensors 85 and the lift mechanism are brought to "home" positions, to await the start of a rack loading operation, this is reflected at logic point 100. While waiting for a transport rack to be positioned for loading, trays filled with product are being advanced by the conveyor 10, and these trays are being pre-loaded onto the lift mechanism, which indexes upward one bracket position after each pre-load operation. The pre-load operation is indicated generally at logic point 101. The number of pre-loaded trays in the lift mechanism is registered, and further pre-loading is discontinued when a predetermined number of trays have been pre-loaded onto the lift, and there is still no transport rack in position to be loaded. In this respect, under normal production sequences, a relatively few trays will be pre-loaded in the lift mechanism during the exchange of racks, so that frequently the pre-load limit is not reached.

When the presence of an empty transport rack 27 is sensed, indicated at logic point 102, the scanning operation is commenced. This is completed in a single high speed traverse of the sensing elements from bottom to top (or vice versa) of the newly positioned empty rack. Scanning is indicated at logic point 103. After completion of scanning, indicated at logic point 104, the available information is analyzed and processed and a load sequence is constructed indicated at logic point 105. The building of the load sequence is the result of analyzing the position and condition of the various tray-supporting brackets 82 of the transport rack, in conjunction with the number and location of trays already pre-loaded onto the lift mechanism and the presence of obstructions, if any, on the rack. Desirably, the entire load sequence, from beginning to end, is calculated in advance of any actual operations, so that the physical loading may proceed in the most rapid and efficient sequence this will be described hereinafter, with reference to FIGS. 13-15.

In the logic flow diagram of FIG. 11, the sequence building operation, logic point 105 is analyzed at 106 to ascertain if unusual conditions are indicated that would prevent a complete rack loading operation from being successively completed. In such case, an error indication is given, at logic point 107 and the operation is stopped. Otherwise, the sequence proceeds as follows:

The individual operations, previously compiled in the sequence building operations, are extracted in sequence from the load sequence table, indicated at logic point 108. The operation is tested at 109 to determine if the entire rack has been loaded, in which case the logic branches off and a new sequence is initiated. If the rack is not fully loaded, the pusher mechanism 31 and lift mechanism 14 are adjusted as indicated at logic point 110. If the next operation in the sequence is a pre-load, the pre-load pusher 26 is actuated to move a tray from the conveyor section onto lift brackets 15 previously located at the proper level. The test for pre-load is indicated at logic point 111, and the pre-load operations at logic point 112. If instead, the next operation is a loading operation, calling for a tray to be pushed from the lift mechanism onto the transport rack, it is tested at logic point 113 to determine if the push is to the rear of the rack, in which case such operation is initiated at logic point 114. If there is a jam, indicated by actuation of the compression switch 74, the sequence is diverted at logic point 115, retraction of the pusher mechanism 31 is initiated at 116, and the sequence is returned to logic point 105, for the building of an entire new sequence of operations, based upon loading that has already occurred, taken together with the newly developed information that a tray position previously thought to be available must be by-passed.

If the test at 113 is negative, the operations proceed to logic points 117-120, for loading of the front portion of the rack, subject to test for jamming and, rebuilding of the loading sequence if such is encountered.

Figure 12:
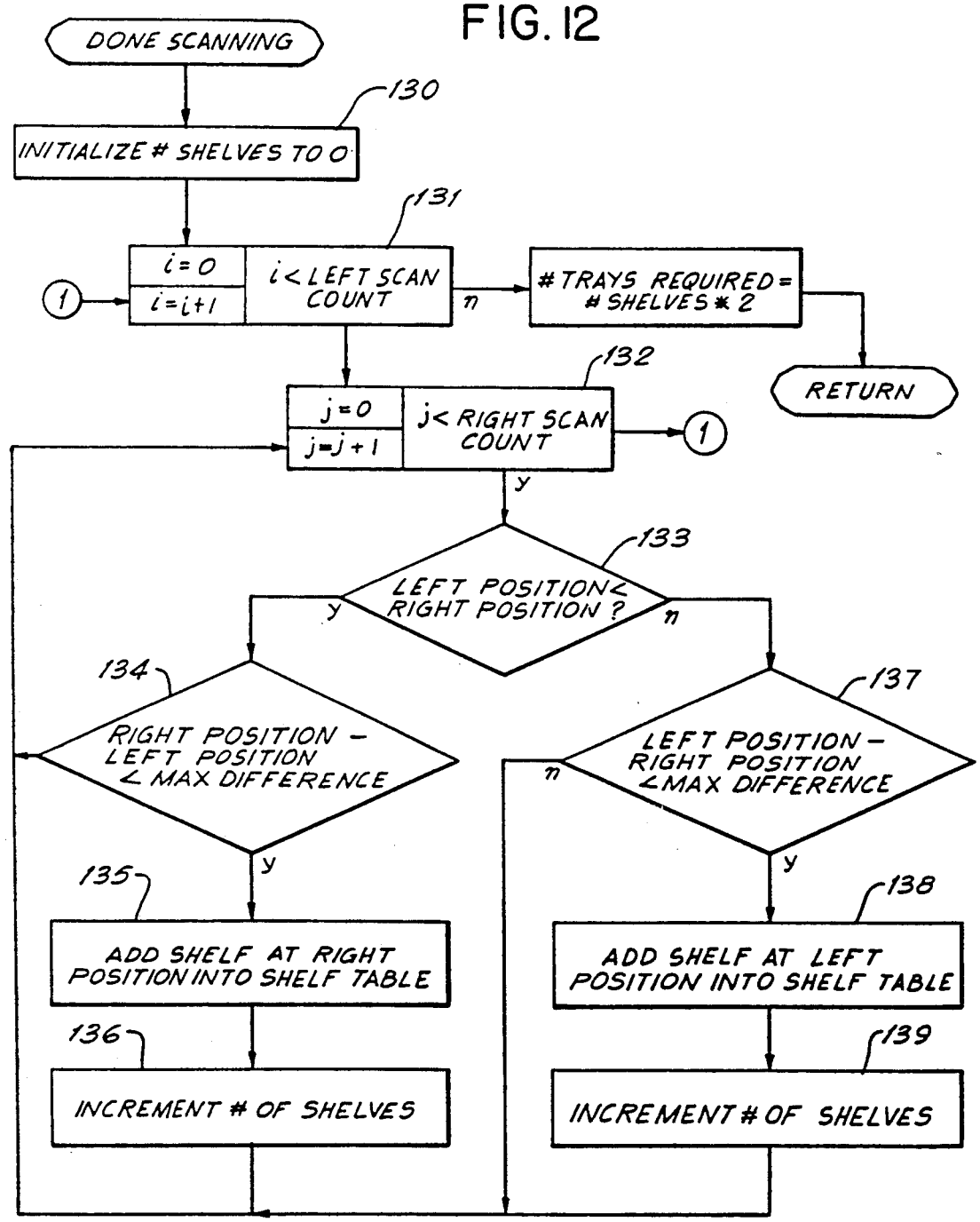

FIG. 12 reflects the logic of the initial optical scanning operation, which starts by setting an index of the number of the tray-holding brackets to zero, at logic point 130. The scan data for the left and right side brackets is extracted at 131, 132. At logic point 133, the data for the given bracket pair is examined to determine whether the left bracket or the right bracket is higher. If the right bracket is higher, the system proceeds to logic point 134 to determine whether the height difference between the brackets exceeds a preset standard. If it does, the shelf position is discarded and the logic is recycled. If the height difference between brackets of a pair is acceptable, the height position of the right bracket is registered in an action table, at logic point 135, the number of shelves is incremented at 136 and the process proceeds back to logic point 131 after incrementing of indexes. The next pair of shelf brackets is again tested at logic point 133. Assuming at this time that the left bracket position is higher than the right, the system proceeds to logic point 137 to test for the height differential. If acceptable, the system proceeds to logic points 138 recording the height of the left shelf bracket into the action table and incrementing the number of shelves at logic point 139. By this process, all of the usable bracket positions are recorded with the height level of each usable pair being recorded as the height of the higher of the two brackets.

In conjunction with the processing of data from the optical scan, as set forth above, data from the acoustic scan is processed, so that possible tray load positions in the transport rack, indicated to be obstructed, are coded in the data base to be by-passed in the building of the load sequence.

Figure 13:
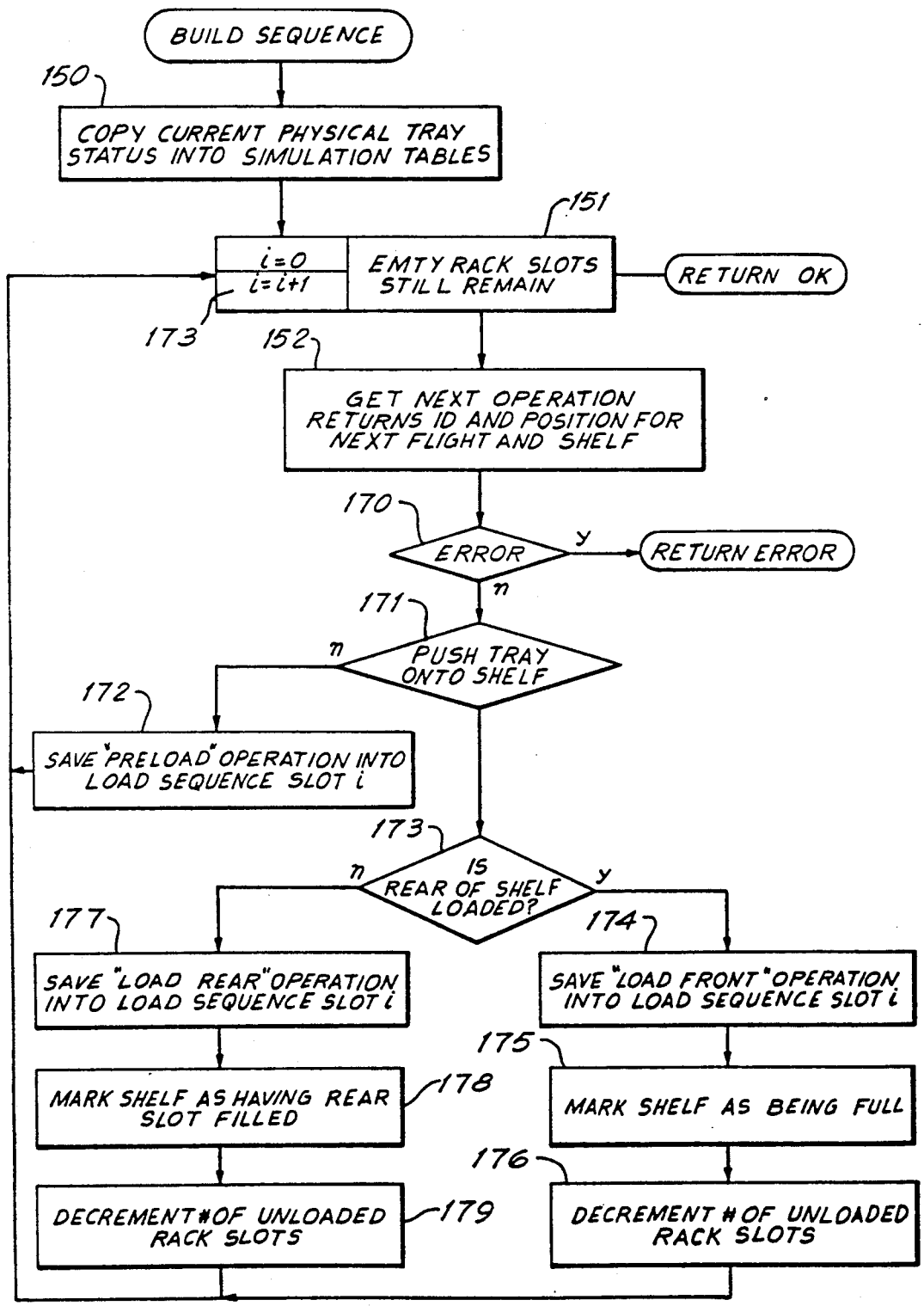
Figure 14:
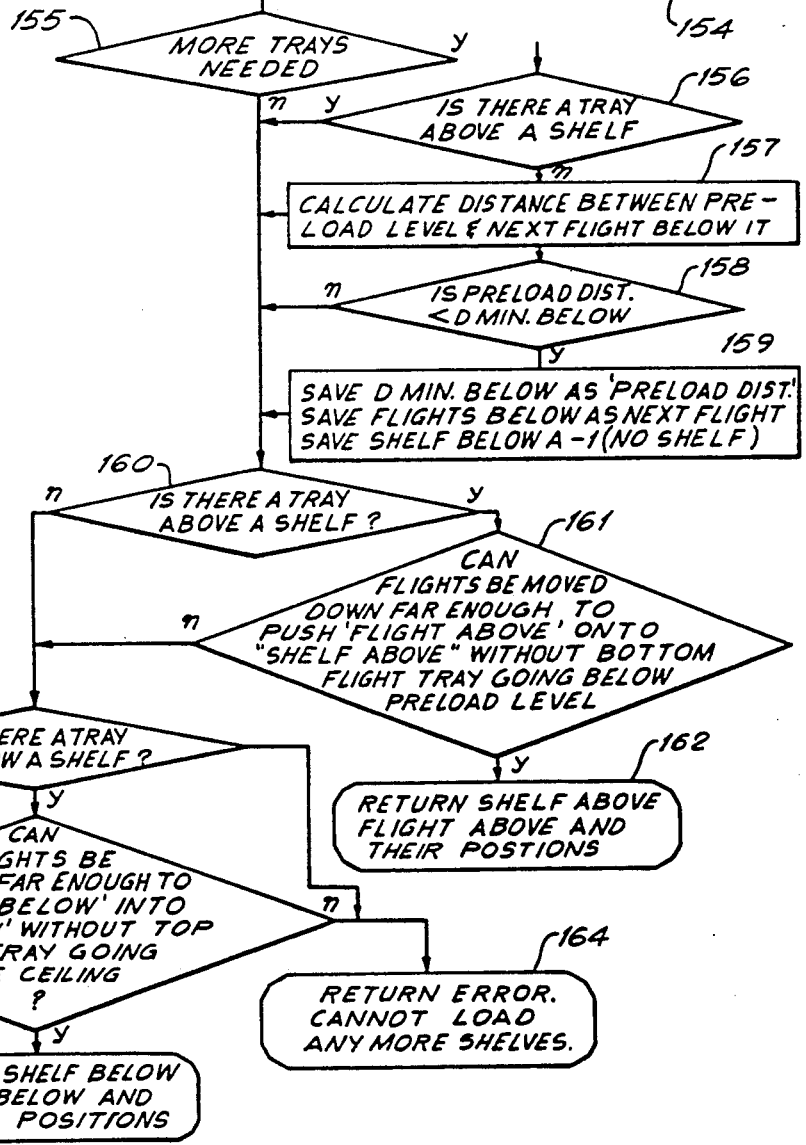
Figure 15:
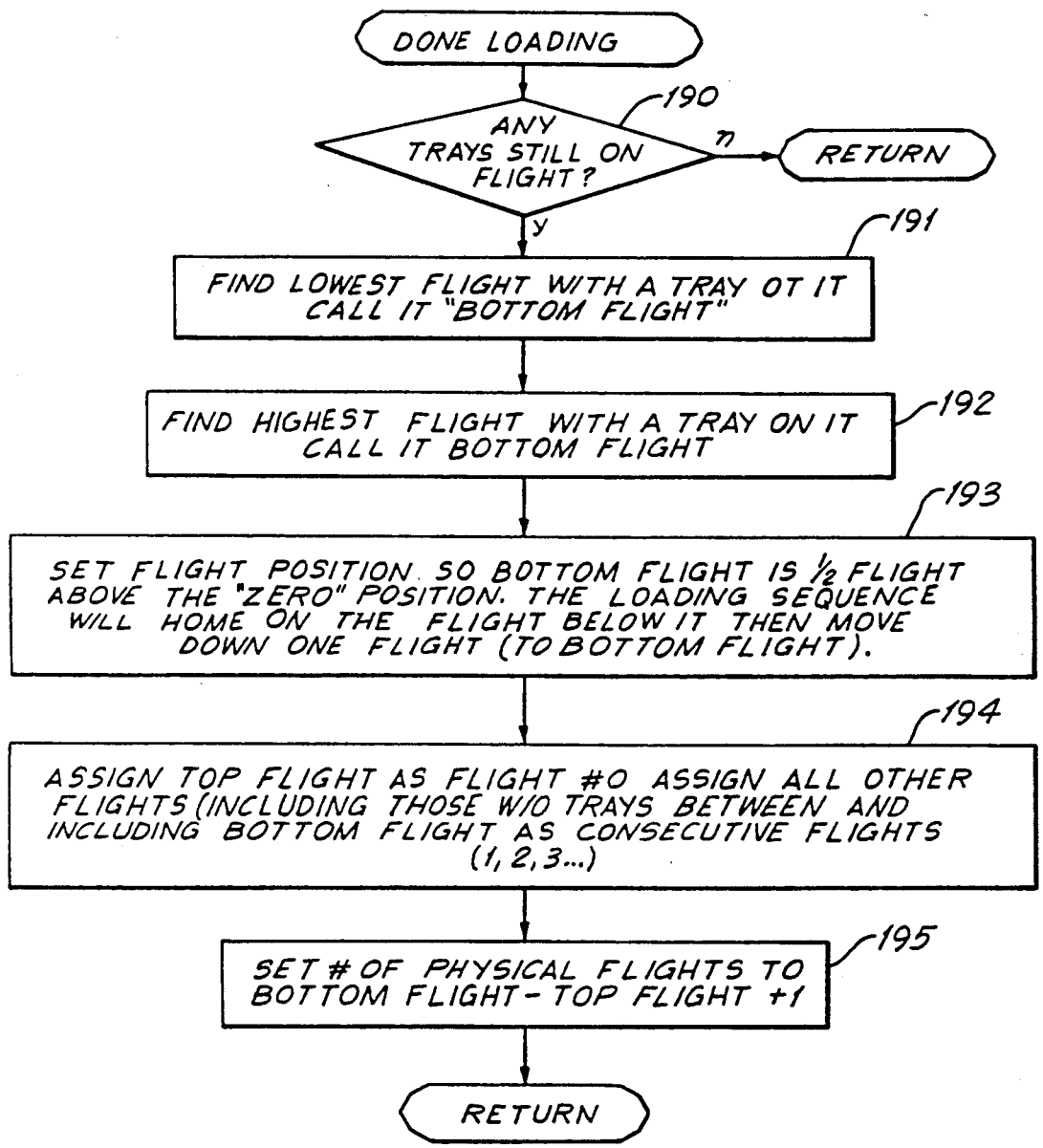
Figure 16:
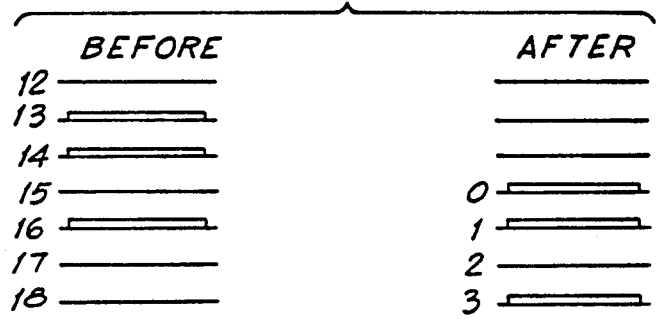

FIGS. 13-15 illustrate the logic operations performed in the building of a sequence table, which controls the sequence of the various loading and pre-loading operations, movements of the lift mechanism and movements of the pusher mechanism throughout the process of loading an empty transport rack. Desirably, the complete sequence is constructed through a simulation process, which is then followed by performance of the various operations in the sequence constructed.

At logic point 150, the physical data of the just-scanned transport rack is stored along with the status of the lift mechanism, including particularly the number and location of pre-loaded trays present on the lift. At logic point 151 the system is tested to see if empty load positions remain in the rack. If that test is answered in the affirmative, the system proceeds to logic point 152, where the tables are examined to determine the position of the "next" rack position and the "next" lift position. There are a number of steps to this operation, the components of which are illustrated in FIG. 14. The first operation, at logic point 153 is to determine the particular combination of loaded lift flight and empty rack position, where the distance between the two is less than any other combination, and where also the tray on the lift is below the open rack position. This data is temporarily saved. At logic point 154, similar data is derived and saved, for a combination where the loaded lift flight is above an open rack position.

The data is tested at logic point 155 to determine whether pre-loading of additional trays onto the lift mechanism is indicated. If that test is positive, the next test is whether any tray on the lift mechanism is above any open rack position. This is done at logic point 156. If that test is answered in the affirmative, additional tray pre-loading is aborted. In this respect, it is desired in the process of the invention that any time a condition exists where a pre-loaded tray has been elevated to a position above any empty rack position, no additional trays will be pre-loaded onto the lift mechanism until the tray or trays in question have been loaded onto the transport rack. This tends to assure avoiding of a condition in which a pre-loaded tray is above the highest available load position of the transport rack, but where the lift mechanism cannot be operated in the down direction.

If the data test at logic point 156 is satisfactory, the system proceeds to logic point 157 where a determination is made as to the distance between the pre-load level (that is, the conveyor level, at which pre-loading takes place) and the first set of lift brackets below the pre-load position. For convenience, that is referred to as the pre-load distance.

At logic point 158 a comparison is made between the pre-load distance and the distance determined at logic point 153 as the smallest distance between an open rack position and the loaded lift brackets immediately below (referred to for convenience as upward load distance). If the pre-load distance is greater than the upward load distance, the pre-load operation is postponed, allowing the loading operation to take place first, as this can be accomplished with a lesser upward movement of the lift mechanism. This is registered at logic point 159.

Whether or not a pre-load operation was indicated, the system proceeds to logic point 160, where the process branches to logic point 161 if there is a tray anywhere on the lift mechanism that is above an open position on the transport rack. At logic point 161 the data is tested to see whether the lift mechanism can be moved in reverse, without causing any tray on the lift mechanism to go below the pre-load level. If that can be done, the data is recorded at logic point 162. If the lift mechanism is determined at logic point 161 to be unable to move downward the required distance, the data is next tested at logic point 163 to determine if there is a tray anywhere on the lift mechanism which is below an open rack position. If the test answers in the negative, an error condition is indicated at logic point 164, as it is no longer possible to continue the loading process.

If the test at logic point 163 is affirmative, the data is again tested at logic point 165 to determine if the lift mechanism can move upwardly a distance equal to the upward load distance, without causing a tray at the top of the lift mechanism to be carried above any predetermined limit position at the top. If that test is negative, an error condition is indicated at logic point 164, if not, the system proceeds to logic point 166, which returns the data for the desired load operation.

At the end of the procedures described in FIG. 14, the system returns to logic point 170 (FIG. 13), which first examines whether the return is an error. If not, it examines at logic point 171 whether the next operation is a "pre-load" or a "load". If a pre-load, the system branches to logic point 172, to store the data required for the pre-load operation, and the system loops back to logic point 151, indexing the count of available rack positions at logic point 173.

If the test at logic point 171 indicates that the next operation is a "load" operation the data is tested at logic point 173 to determine whether the rear position or front position of the rack is to be loaded. If the front position is to be loaded, the logic branches to logic points 174, 175 and 176. At 174, the load information is saved in the sequence memory position (i), the rack position is indicated as being "full" at logic position 175, and the number of unloaded rack positions is decremented at logic point 176.

If the rear rack position is to be loaded, the system branches to logic points 177, 178 and 179, performing similar operations to logic points 174, 175, 176, although at logic point 178 the data is registered so as to indicate only the rear position of the rack to be filled, as will be understood.

In the preferred practice of the invention, all of the operations performed as described, with reference to FIGS. 13 and 14, are simulated operations, the purpose of which is to construct a data table representing the entire sequence of operation involved in loading the empty transport rack. After the simulation has been completed, the actual load and pre-load operations are carried out in sequence, resorting to successive data positions in the just-constructed sequence table to control the movements of the lift mechanism, pusher mechanism and pre-load elements.

In a normal loading sequence, when a transport rack 27 has been completely filled and is ready to be exchanged for an empty rack, the lift mechanism customarily will be completely empty of trays. In some cases, however, where an unexpected anomaly has been encountered in the loading of a rack, causing the load cell element 74 to be actuated and the pusher mechanism 31 retracted with its tray undelivered, the loading operation may be concluded with one or more trays remaining on the lift mechanism. This results from the fact that, if an anomaly is detected, the complete load sequence is reconstructed, following the procedures of FIGS. 13 and 14. In the case of a rebuild resulting from an interrupted loading sequence, the starting data includes a partially filled rack, in all likelihood, a partially, and perhaps somewhat randomly, filled lift mechanism. For such cases, one of the initial steps is to reposition the lift mechanism according to the logic diagram of FIGS. 15 and 16.

At logic point 190 (FIG. 15), the system tests whether there are trays remaining on the lift mechanism. If none, all that needs to be done is to zero out the data. If trays exist, the lowest tray is identified at logic point 191, the highest tray is identified at logic point 192, and the lift mechanism is actuated via logic point 193 to position the lowermost tray approximately one half position above the pre-load position. The topmost tray is assigned the number zero for indexing purposes, and successively lower positions are assigned successively incremented numbers (see FIG. 16). This is carried out at logic point 194. At logic point 195, the number of active positions of the lift mechanism is recorded for use in building the load sequence for the remainder of the operations.

The method and apparatus of the invention provide a economical yet wholly effective approach to the automated loading of transport trays, especially of the type used for the distribution of bakery products. The equipment is easily adapted to function with the particular size and style and transport racks used by a given end user, and is able to cope with the fact that such racks generally are somewhat nonstandard in terms of spacing of the tray supports, and even the relative height of a particular pair of tray supports. The system is also able to cope adequately with the typical state of disrepair of many of the transport racks, as well as with the fact that the racks may not be serviced in an ideal fashion, in terms of removal of all empty trays, etc. A significant feature of the new process is the initial scanning of an empty rack, to provide an information data base respecting the status of its tray supports, in terms of exact location, relative symmetry, condition of repair or disrepair, and even the inadvertent presence of empty trays or other obstructions. After the scanning operation has taken place, a computer-directed loading sequence is carried out in a manner to achieve a highly efficient loading of product trays into available positions on the transport rack.

The system employs a tray lift mechanism, comprised of chains or endless belts, carrying a plurality of lift brackets arranged to support trays filled with products and elevate them to a predetermined location on the transport rack. Operating in conjunction with the lift mechanism is an independently movable pusher mechanism, which is directed to proceed to the level at which a tray is to be displaced from the lift mechanism onto the transport rack. The pusher mechanism is constructed, preferably in a two-stage arrangement, to displace product-filled trays from the lift mechanism into either back or front positions of the transport tray.

In the procedure of the invention, loading of product-filled trays onto the transport rack proceeds generally from the bottom to the top of the rack and, in such manner that, insofar as practicable, no product-filled tray is carried by the lift mechanism above any empty position of the rack. In addition, product-filled trays already pre-loaded onto the lift mechanism when a new transport rack is brought into loading position and scanned, are at least partially loaded onto the rack before any further trays are pre-loaded onto the lift mechanism, so that, insofar as practicable, there will be no new trays loaded onto the lift mechanism while the lift mechanism carries filled trays at levels above empty positions in the transport rack.

In the procedure of the invention, the loading of trays from the lift mechanism onto the transport rack takes place together with interspersed operations of pre-loading product-filled trays from a supply conveyor onto the lift mechanism. In general, after each operation, whether load or pre-load, the system is examined to determine what subsequent operation should take place, with a minimum of motion of the lift mechanism. If possible, the next operation scheduled is that which requires the least motion of the lift mechanism, preferably upward.

Inasmuch as loading operations sometimes cannot be completed, for unforeseen reasons (such as an unscannable obstruction somewhere within the rack structure), provision is made for gripping the back edge of each tray by the pusher mechanism used to insert trays in the transport rack. The gripper mechanism incorporates a load sensing switch such that, if the tray being loaded meets unexpected resistance, the pusher mechanism immediately retracts, bringing back with it the tray, so that the tray is returned to its pre-load position on the lift mechanism. The gripping device used for this purpose advantageously includes a lifting element, insertable underneath a sagging mid-portion of a loaded tray, to lift the mid-portion of the tray to the normal plane of the tray during loading operations.

Among the advantageous procedures followed in accordance with the present invention is the analysis of the initial scan of shelf brackets and the selection of the higher bracket of each pair to use as a reference for positioning of the lift mechanism and the pusher mechanism. In this manner, it is assured that a tray can always be pushed off of the lift mechanism into the transport rack. At the same time, if the height disparity between opposed tray-holding brackets of a pair is too great, the rack position will be by-passed altogether, to minimize or avoid the possibility of a tray falling off its supports in the rack during transportation.

As will be understood, the procedures and equipment utilized herein for the loading of bakery products into transportation racks may also be used for the unloading or selective unloading of such racks. Such a procedure may be desired for the reorganization of loaded transport racks, for example, to satisfy particular custom orders, where it may be desired to load products of different types onto different shelves of a rack. Typically, such a procedure would be carried out as a secondary operation, after initial loading of transport racks with products of a common type. Where the equipment is set up for unloading, the control of the lift mechanism and pusher mechanism is modified to locate these devices with reference to the lower bracket of each bracket pair on the transport rack, instead of the higher bracket, which is referenced for loading operations.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A method of loading a transport rack with trays of bakery products, wherein the transport rack comprises a plurality of vertically spaced pairs of tray-holding brackets, and wherein a tray-loading mechanism is provided for positioning trays in loading relation to, and inserting trays onto, said pairs of brackets from the front of said transport rack: which comprises
   (a) positioning an empty transport rack in a predetermined load position in relation to said tray-loading mechanism,
   (b) vertically scanning said transport rack at each side thereof by scanning means operative to sense the presence of each bracket of each pair of said tray holding brackets and register its vertical height above a reference position, and
   (c) loading said pairs of brackets in a predetermined sequence with said trays, with said loading mechanism, after positioning said trays in load relation to the higher bracket of each pair thereof.

2. A method according to claim 1, further characterized by,
   (a) measuring a duration of sensing a given tray-holding bracket and comparing such duration with a known standard to identify deformed brackets, and
   (b) registering the height location of any deformed brackets to cause said loading mechanism to by-pass such brackets during a loading operation.

3. A method according to claim 1, further characterized by,
   (a) in connection with said scanning operation, measuring a difference in vertical height between brackets of an opposed pair thereof and comparing said difference against a known standard, and
   (b) registering the height location of any bracket pair having a height differential in excess of said known standard to cause said loading mechanism to by-pass such brackets during a loading operation.

4. A method of loading a transport rack with trays of bakery products, wherein the transport rack comprises a plurality of vertically spaced opposed pairs of tray-holding brackets, wherein a tray-loading mechanism is provided for positioning trays in loading relation to, and inserting trays onto, said pairs of brackets from the front of said transport rack, wherein said tray-loading mechanism includes a tray-lifting mechanism having a plurality of vertically spaced sets of tray-lifting elements and means for moving said elements vertically in unison, and wherein said tray-loading mechanism further includes a pusher mechanism vertically movable independently of said tray-lifting mechanism, for pushing selected trays from said lifting mechanism onto tray-holding brackets of said rack, which comprises
- (a) positioning an empty transport rack in a predetermined load position in relation to said tray-loading mechanism,
- (b) successively positioning tray-lifting elements at a pre-load position to receive trays loaded with product and indexing said lifting mechanism vertically after a tray is pre-loaded onto said lifting mechanism,
- (c) vertically indexing said lifting mechanism to position a selected pre-loaded tray in load relation to an empty pair of brackets on said transport rack,
- (d) vertically moving said pusher mechanism independently of said lifting mechanism to a position opposite said selected pre-loaded tray and loading said tray onto said rack,
- (e) initially scanning said transport rack on opposite sides thereof to register a vertical height above a reference position of each bracket of each pair thereof, and
- (f) controlling the vertical movements of said lifting and said pushing mechanisms in accordance with the registered height of the higher bracket of each opposed pair thereof, whereby to position selected pre-loaded trays relative to the higher bracket of each pair.

5. A method according to claim 4, further characterized by,
- (a) calculating a height differential between the brackets of each opposed pair thereof and comparing said differential with a known standard, and
- (b) registering any bracket pair of greater than standard height differential and thereafter causing said lifting mechanism and said pusher mechanism to by-pass such bracket pair during tray loading operations of the current transport rack.

6. A method according to claim 4, further characterized by,
- (a) during said scanning operation, measuring the distance required to complete the scan of any tray-holding bracket of said transport rack and comparing said distance to a known standard, and
- (b) registering any bracket pair having a bracket requiring greater than standard distance for scanning and thereafter causing said loading mechanism and said pusher mechanism to by-pass such bracket pair during tray loading operations of the current transport rack.

7. A method according to claim 4, further characterized by,
- (a) controlling upward movements of said tray-lifting mechanism to stop said mechanism whenever a set of pre-loaded tray-lifting elements is aligned with an non-loaded position of said transport rack, and
- (c) moving said pusher mechanism to the position of said aligned pre-loaded tray-lifting elements for displacement of the tray thereon onto said non-loaded position of the transport rack.

8. A method according to claim 7, further characterized by,
- (a) controllably extending said pusher mechanism to one of a first and second stage of extension, for loading product-filled trays into one of a front and rear position of said transport rack
- (b) whereby said pusher control means is operative to load a tray into the rear position of said rack if said position is empty.

9. A method according to claim 8, further characterized by,
- (a) sensing said pusher mechanism meeting a predetermined resistance to movement and, in response thereto, withdrawing said pusher mechanism from said transport rack without depositing a tray therein.

10. A method according to claim 1, further characterized by
- (a) acoustically scanning the interior of said transport rack for the presence of obstructions, and
- (b) registering the location of any rack position at which an obstruction is indicated, to enable said position to be by-passed during loading of said rack.

* * * * *